US005767807A

United States Patent [19]

Pritchett

[11] Patent Number: 5,767,807

[45] Date of Patent: Jun. 16, 1998

[54] COMMUNICATION SYSTEM AND METHODS UTILIZING A REACTIVELY CONTROLLED DIRECTIVE ARRAY

[75] Inventor: Don Michael Pritchett, Apalachin, N.Y.

[73] Assignee: International Business Machines Corporation, Armonk, N.Y.

[21] Appl. No.: 658,327

[22] Filed: Jun. 5, 1996

[51] Int. Cl.[6] .......... H04B 7/00

[52] U.S. Cl. .......... 342/374; 343/833; 343/834

[58] Field of Search .......... 343/700 MS, 790, 343/814, 815, 816, 817, 818, 819, 833, 834, 836, 837, 846, 853; 342/374, 433, 435

[56] References Cited

U.S. PATENT DOCUMENTS

| | | | |
|---|---|---|---|
| 3,109,175 | 10/1963 | Lloyd . | |
| 3,383,694 | 5/1968 | Strohmeyer | 343/833 |
| 3,560,978 | 2/1971 | Himmel et al. . | |
| 3,725,938 | 4/1973 | Black et al. | 343/836 |
| 3,883,875 | 5/1975 | McClymont et al. . | |
| 4,123,759 | 10/1978 | Hines et al. | 342/374 |
| 4,277,787 | 7/1981 | King | 342/374 |
| 4,631,546 | 12/1986 | Dumas et al. . | |
| 4,700,197 | 10/1987 | Milne . | |
| 4,864,320 | 9/1989 | Munson et al. | 343/833 |
| 4,924,235 | 5/1990 | Fujisaka et al. | 342/374 |
| 5,294,939 | 3/1994 | Sanford et al. . | |
| 5,410,321 | 4/1995 | Gordon et al. | 343/374 |

OTHER PUBLICATIONS

"Reactively Controlled Directive Array" by R.F. Harrington, IEEE Transactions on Antennas An Propagation, vol. AP-26, No. 3, May 1978, pp. 390–395.

*Primary Examiner*—Donald T. Hajec
*Assistant Examiner*—Tho Phan
*Attorney, Agent, or Firm*—Joseph C. Redmond; John D. Flynn

[57] ABSTRACT

A reactively controlled directive antenna array that has a single central monopole or dipole as a radiating element excited directly by a feed system. A plurality of parasitic elements surround the radiating element and through changing the state of the parasitic impedance causing the antenna to be in an omni directional or beam pointing mode according to whether the parasitic elements are open circuited or short circuited. A computer modem and memory including stored programs control the antenna array in an omnidirectional or directive mode to locate, identify and communicate with nodes in a wireless communication network. A stored table is created in the memory indicating the antenna direction for communicating with each node in the network. Using the stored table, the computer initiates a communication sequence with a selected node, the sequence having the advantages of improved signal sensitivity and angular discrimination for wireless communication systems.

11 Claims, 14 Drawing Sheets

Parasitic Monopole Array

Parasitic Monopole Array

Loading Profile for
Directive Pattern 4.25 GHz

FIG. 9 Node Direction Table Compilation

Node A 83

| Node ID | Node Direction |
|---|---|
| B | 90° |
| C | 135° |

Node B 85

| Node ID | Node Direction |
|---|---|
| A | 270° |
| C | 225° |

Node C 86

| Node ID | Node Direction |
|---|---|
| A | 315° |
| B | 45° |

FIG. 10

Direction Tables stored
in Memory for Nodes A, B, C.
(All Directions in 16 Bit Patterns)

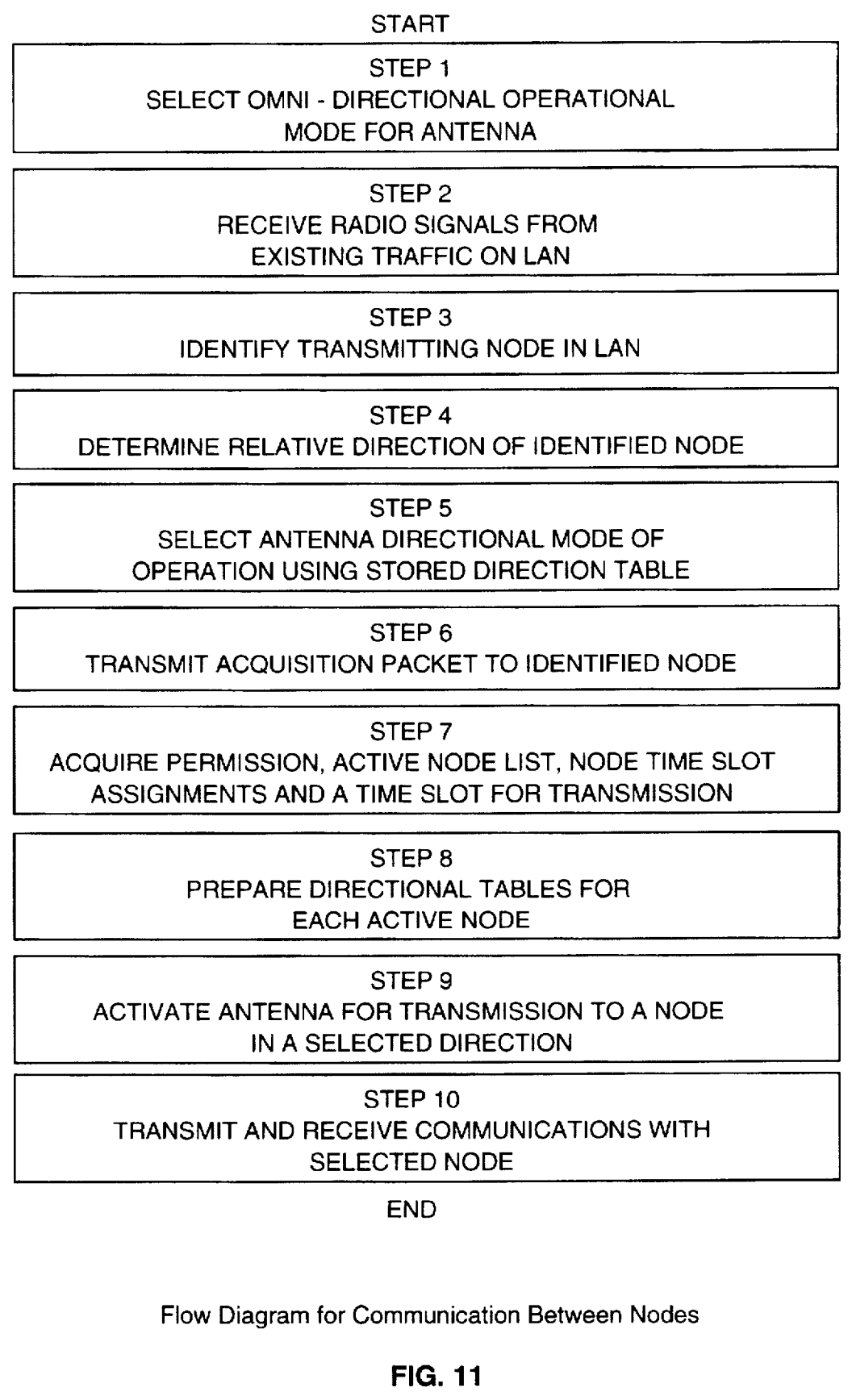

START

STEP 1
SELECT OMNI - DIRECTIONAL OPERATIONAL MODE FOR ANTENNA

STEP 2
RECEIVE RADIO SIGNALS FROM EXISTING TRAFFIC ON LAN

STEP 3
IDENTIFY TRANSMITTING NODE IN LAN

STEP 4
DETERMINE RELATIVE DIRECTION OF IDENTIFIED NODE

STEP 5
SELECT ANTENNA DIRECTIONAL MODE OF OPERATION USING STORED DIRECTION TABLE

STEP 6
TRANSMIT ACQUISITION PACKET TO IDENTIFIED NODE

STEP 7
ACQUIRE PERMISSION, ACTIVE NODE LIST, NODE TIME SLOT ASSIGNMENTS AND A TIME SLOT FOR TRANSMISSION

STEP 8
PREPARE DIRECTIONAL TABLES FOR EACH ACTIVE NODE

STEP 9
ACTIVATE ANTENNA FOR TRANSMISSION TO A NODE IN A SELECTED DIRECTION

STEP 10
TRANSMIT AND RECEIVE COMMUNICATIONS WITH SELECTED NODE

END

Flow Diagram for Communication Between Nodes

FIG. 11

COMMUNICATION SYSTEM AND METHODS UTILIZING A REACTIVELY CONTROLLED DIRECTIVE ARRAY

BACKGROUND OF THE INVENTION

1. Field of the Invention

This invention relates to communication systems. More particularly, the invention relates to digitally beam steered antenna arrays in wireless communication systems.

2. Description of Prior Art

A viable approach for achieving enhanced sensitivity in radio frequency links is by using an antenna with more directive gain. This gain is at the expense of angular coverage, so that the beam must be re-pointed to get wider coverage.

If there is a necessity for very rapid beam steering, electronic methods are generally preferred over mechanical rotation of fixed beam antennas. Electronic methods are also favored for reliability, weight and other considerations.

Traditional methods for achieving electronic scanning have drawbacks. The most conceptually simple method, where multiple fixed beam antennas are pointed in different directions and are switched into an active channel, demand much hardware, consume considerable volume (with weight implications), and often suffer very significant switch losses. Phase arrays with fixed beamformer, such as multi-port lens or Butler Matrix Networks have beamformer losses in addition to switch losses. Phased arrays with variable phase-shifter beamformers are complex and expensive and their feed distribution and phase shifter networks are also lossy.

A variably loaded parasitic antenna array adapted for beam steering in a wireless communication system has advantages of simplicity, efficiency and reliability when compared to other beam steering approaches. In such a reactively loaded antenna, there are no transmission lines to the individual elements, the excitation of elements being accomplished by electro-magnetic interaction. There is only one feed point, which simplifies the problem of matching the antenna to the transmitter. Since only one radiator is fed directly, the complexity and loss associated with the feed manifold is eliminated. Also, lossy in-line switching and/or phase shifters are not needed. The switches used in the parasitic array are distributed so that the total system loss is less. Finally, reactive loads can provide a means for beam steering using either mechanical or electronic switches.

A number of variably loaded parasitic arrays are known in the art, as follows:

An article by R. F. Harrington, published in the IEEE Transactions on Antennas and Propagation, Vol. A-26, No. 3, May 1978, pages 390–395, discloses the concept and the theory of an n-port antenna system having reactively loaded radiators disposed about a radiator which is directly fed. By varying the reactive loads of the elements in the array, it is possible to change the direction of maximum gain of the antenna array. An example is given of a circular arrangement of reactively-loaded dipoles surrounding a control directly-fed dipole U.S. Pat. No. 3,109,175 discloses an active antenna element mounted on a ground plane and a plurality of parasitic elements are spaced along a plurality of radial extending outwardly from the central element to provide a plurality of radially extending directive arrays. A pair of parasitic elements are mounted on a rotating ring, which is located between the central active antenna element and the radially extending active arrays of parasitic element and rotated to provide an antenna system with a plurality of high gain radially extending lobes.

U.S. Pat. No. 3,560,978 discloses an electronically controlled antenna system comprising a monopole surrounded by two or more concentric arrays of parasitic elements which are selectively operated by digitally controlled switching devices.

U.S. Pat. No. 3,883,875 discloses a linear array antenna combined with a transmitting means for exciting n−1 of said elements in turn, and an electronic or mechanical commutator providing successive excitation in accordance with a predetermined program. Means are provided for short-circuiting and open-circuiting each of the $n_{-1}$ elements, and the short-circuiting and open-circuiting is operated in such a manner that during excitation of any one of said elements the elements to the rear of the excited elements operate as a reflector and the remaining n−2 elements remain open circuited and therefore electrically transparent. A permanent non-excited element is located at one end of the array.

U.S. Pat. No. 4,631,546 discloses a central driven antenna element and a plurality of surrounding parasitic elements combined with circuitry for modifying the basic omnidirectional pattern of such antenna arrangement to a directional pattern by normally capacitively coupling the parasitic elements to ground, but on a selective basis, changing some of the parasitic elements to be inductively coupled to ground so they act as reflectors and provide an eccentric signal radiation. By cyclically altering the connection of various parasitic elements in their coupling to ground, a rotating directional signal is produced.

U.S. Pat. No. 4,700,197 discloses a plurality of coaxial parasitic elements, each of which is positioned substantially perpendicular to but electrically isolated from a ground plane and arranged in a plurality of concentric circles surrounding a central driven monopole. The parasitic elements are connected to the ground plane by pin diodes or other switching means and are selectively connectable to the ground plane to alter the directivity of the antenna beam, both in the azimuth and elevation planes.

U.S. Pat. No. 5,294,939 discloses an electronically reconfigurable antenna comprising an array of antenna elements extending several wavelengths over an area. The elements can be reconfigured as active or parasitic elements in the process of variable mode operation. An active subset of antenna elements excites a wave on a parasitic subset of antenna elements which are controlled by a plurality of electronic reactances which may operate in a plurality of modes of wave propagation.

None of the prior art addresses the benefits of a variably loaded parasitic antenna array in a wireless communications system. Moreover, the antenna in the prior art employ complex mechanical and electronic system for directing a beam in a wireless communications system.

SUMMARY OF THE INVENTION

An object of the invention is a wireless communication system having an antenna array configuration with enhanced sensitivity and angular discrimination for communication among a plurality of nodes included in such system.

Another object is a wireless communication system having beam steered variably-loaded parasitic antenna arrays.

Another object is a computer operated, beam steered antenna array for locating, identifying and communicating with a node in a communication system.

Another object is a method of communicating among a plurality of nodes in a wireless communication system using computer operated beams steered, variably loaded, parasitic antenna arrays.

These and other objects, features and advantages are accomplished in a communications network with a plurality of communicating nodes, each node including a beam steered reactively loaded parasitic array. Each array includes a central emitting element having a data input for transmitting and receiving a data bearing radio signal. The array also includes a plurality of parasitic elements proximate to the emitter. Both the emitting and parasitic elements have a control input. An impedance switching circuit is coupled to each one of the parasitic elements for selectively changing the load impedance of each parasitic element through a control signal. The array radiates an omni directional mode radio signal when all of the parasitic elements are in a high impedance state or "open-circuit" state. The array radiates a directed mode radio signal in a selected direction when a selected sub-plurality of parasitic elements are selectively placed in a lower impedance state or "short-circuit" state in response to the switching circuits. A computer having a first data path is coupled to the emitting element for sending and receiving data by the radio signals with other nodes in the communication system. The computer includes a second data path coupled to the switching circuits for outputting signals representing a selected antenna direction. A memory in the computer stores a table of direction values representing directions between a local node and the other nodes of the communication system. The computer communicates with a selected one of the other nodes by accessing a selected direction value from the memory for the selected node and outputting the value on the second path to the switching circuits to direct the parasitic loading of the antenna for directing communication signals from the antenna emitter received from the computer over the first path.

BRIEF DESCRIPTION OF THE DRAWINGS

The foregoing features and advantage of the invention will become further apparent from the following detailed description taken in conjunction with the accompanying drawings, in which:

FIG. 10 is a representation of antenna direction tables for each node in the communication system of FIG. 6.

FIG. 11 is a flow diagram for communication between nodes in the communication system of FIG. 6.

DESCRIPTION OF THE PREFERRED EMBODIMENT

Figure 1:
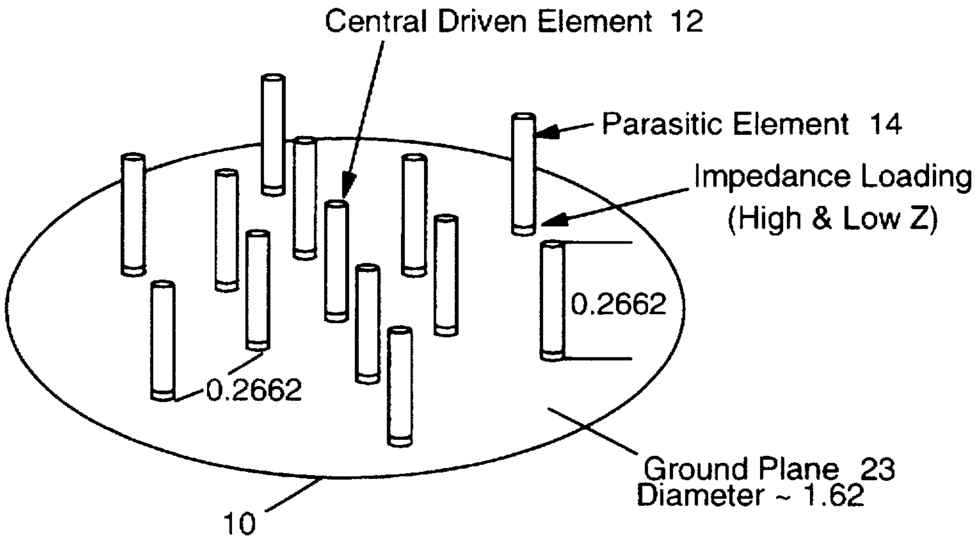
FIG. 1 is an illustration of a parasitic monopole antenna array having a central radiator and a plurality parasitic elements incorporating the principles of the present invention.

In FIG. 1, a reactively controlled directive antenna array comprises a thin circuit card 10 including a single central monopole 12 which is excited directly by a feed system (not shown). The central driven element or radiator 12 is surrounded by radial rows of parasitic elements 14 of the same type as the radiator. Each parasitic element is attached to a ground plane 23 (see FIG. 3) via a controlled load which can be in either a high impedance or "open-circuit" state or low impedance or "short-circuit" state, as will be explained hereinafter. The current flowing in each parasitic element is controlled by switch devices (not shown) which are placed in series with each element. The array directivity and beam direction is controlled by appropriate selection of "on" and "off" parasitic elements. If the parasitic loading is made selectable, then the beam direction in the azimuthal plane is also selectable. If the parasitic loading is changed by electronic or other high speed methods, then a rapid beam scanning or agile beam pointing antenna is achieved.

The parasitic array approach has the advantage of simplicity, efficiency, and reliability when compared to other phased array approaches. Since only one radiator is fed directly, the complexity and loss associated with a feed manifold is eliminated. Also, lossy in line switching and/or phase shifters are not needed. The switches in the parasitic array are distributed so that the total system loss is less. The approaches uses only simple "high impedance" and "low impedance" parasitic load rather then the more general reactive loading suggested by the IEEE article by Harrington, supra. Also, if the integrity of the radiator is maintained, the antenna will continue to provide antenna functions (with degraded performance) if other elements fail. In general, useful antenna patterns are obtained with particular array geometries, element lengths, and element loadings. Since the active array elements are excited by mutual coupling, the phase and amplitude of these currents (and the resulting radiation pattern) depend critically on the physical details of the array and elements.

One embodiment of the antenna comprises an array geometry in which eight radial rows are formed relative to the radiator 12, each radial row including two parasitic elements 14. The critical dimensions for the array are: (1) parasitic element to parasitic element spacing along the radial direction, the preferred spacing being 0.266 wavelengths, and (2) monopole and parasitic lengths of the same length, the preferred length being 0.266 wavelengths. The ground plane diameter is less critical but should be of approximately 1.6 wavelengths or more. These critical dimensions pertain to radiator and parasitic elements having a rod diameter of 0.02 wavelengths. Other rod diameters will work and will affect the best selection of other dimensions. Also, non-cylindrical radiators such as planar geometries or printed circuit boards will work with appropriate adjustments. With this array, implemented with a mechanism to open or short the parasitic elements, an antenna with selectable beam directions and selectable directivity is achieved. If all the parasitic elements are open circuited, then an omni directional pattern characteristic of the H-plane of an isolated monopole is achieved. If selected radial patterns are short circuited then directive patterns are achieved over a useful bandwidth, as will be described hereinafter. Intermediate values of directivity can be achieved by selecting fewer short circuit rows.

Figures 2, 2A:
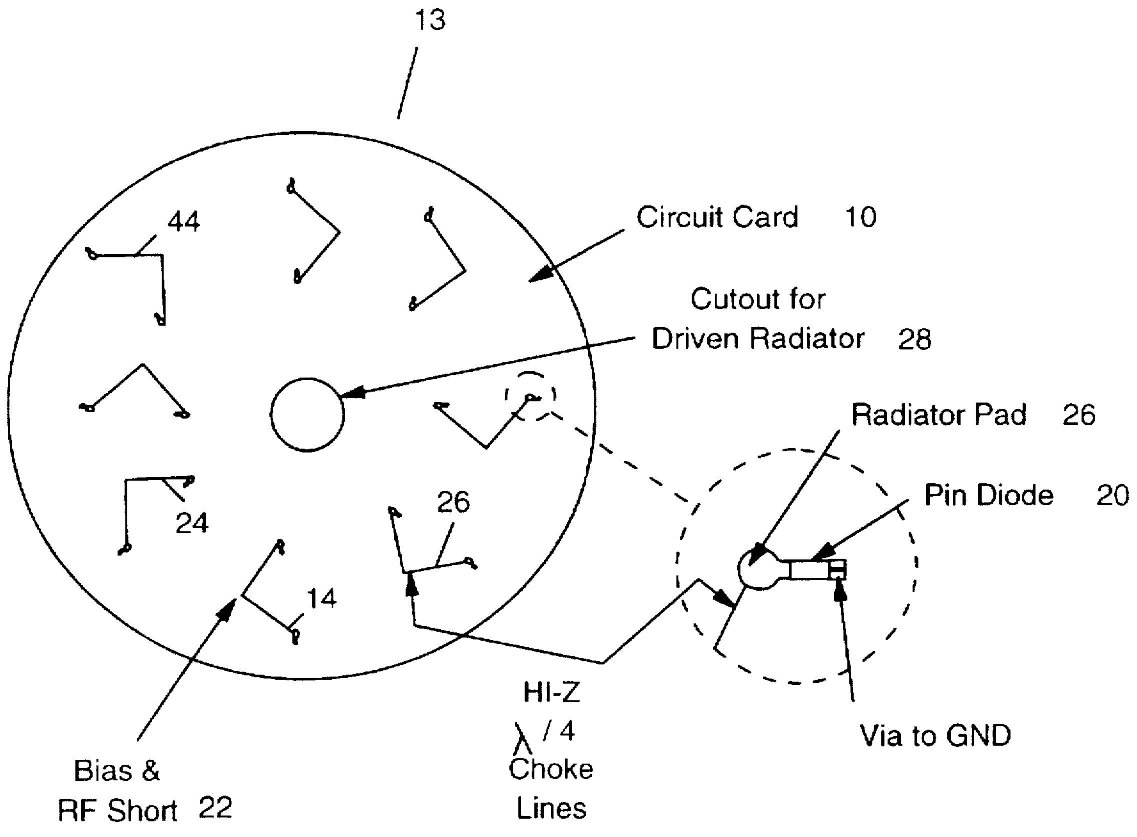
FIG. 2 is an illustration of a bias and switching circuit for the array of FIG. 1.

In FIG. 2 a bias and switch circuit 13 is shown for attachment of the parasitic rods 14 (see FIG. 1). The thin circuit card 10 has etched conductors, as will be described, for attachment of the parasitic rods 14; chip PIN diodes 20, rf chokes 22 in the form of microstrip lines 24 and vias to a ground plane 23 on the back of the card 10 (See FIG., 3). The parasitic elements are attached electrically to circuit pads 26 which connect to the microstrips and one end of the diodes 20. Where additional support is required for the parasitic elements, thin dielectric struts can provide additional support for the parasitic elements without appreciably affecting the antenna radiating pattern. Preferably the rf chokes the parasitic with PIN diodes 20 "off" while allowing a d-c path for a bias current. Lumped-circuit chokes may be used at lower frequencies, if desired. The card 10 includes a cut-out 28 for a monopole radiator 12. The radiator can be a "fat monopole" for impedance advantages. Pins, feed-through and mechanical support features are part of the ground plane chassis 23 (see FIG. 3) to facilitate assembly and provide necessary electrical interfaces. Low reactance capacitors between the bias feed paths and the ground are necessary to reflect the required high impedance at the parasitic bases. While monopoles are shown in FIGS. 1, 2 and 3, they may be changed to dipoles with necessary changes to the card which would be well known to those in the art.

As with conventional monopoles, the size of the ground plane 23 (see FIG. 3) will affect the pattern details. An adequate margin is required between the outer parasitic and the edge of the ground plane to maintain proper phasing in the elements. As one alternative, edge rolling of the ground plane or other edge treatments can be used to minimize effects. In any case, the finite ground plane will tend to lift the pattern peak in the elevation as is seen with isolated monopoles.

Figure 3:
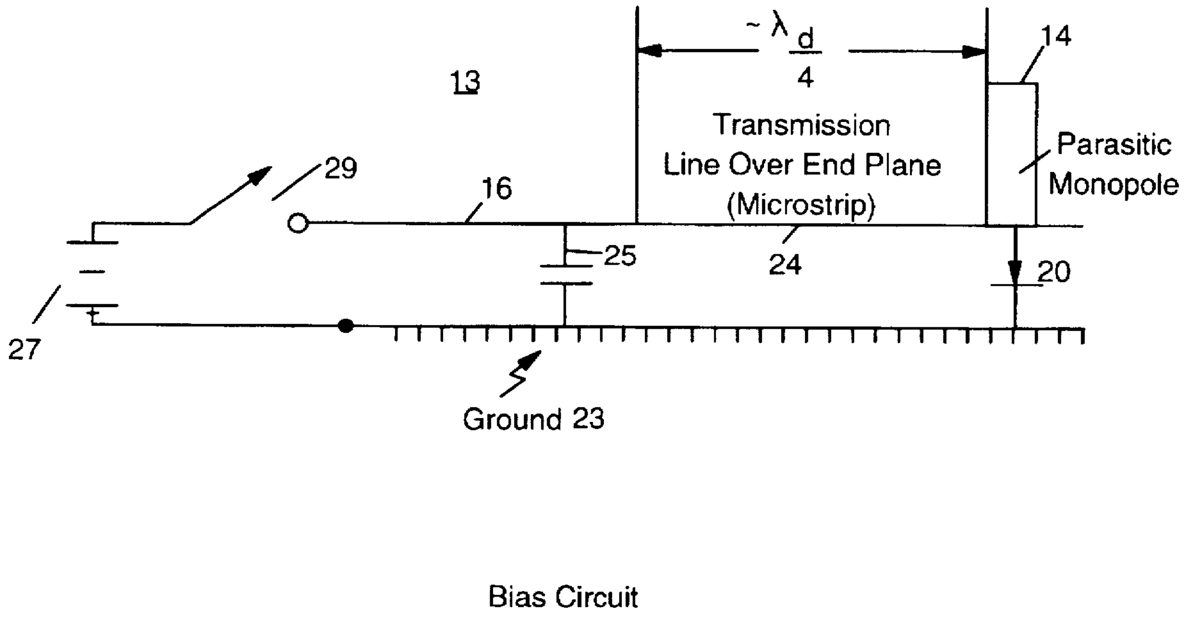
FIG. 3 is a further representation of the bias and switch circuit of FIG. 2.

In FIG. 3, the bias and rf shorting circuit 13 is shown in more detail. Each parasitic element 14 is coupled to a quarter length transmission line such as the micro strip 24 shown in FIG. 2. The PIN diode 20 is connected between the strip 24 and the ground plane 23. A low reactance capacitor 25 is formed between the micro strip and the ground plane at rf frequencies. A bias supply 27 is connected through a computer controlled switch 29 for selectively forward biasing the diode 20 or other suitable switching device. The diode has a high impedance when the switch 29 is open. By electronically altering the switch 29, a radiating signal from the central driven element 12 can be selectively directed, according to the pattern of parasitic elements which are open or short circuited, as will be explained hereinafter.

Figure 4:
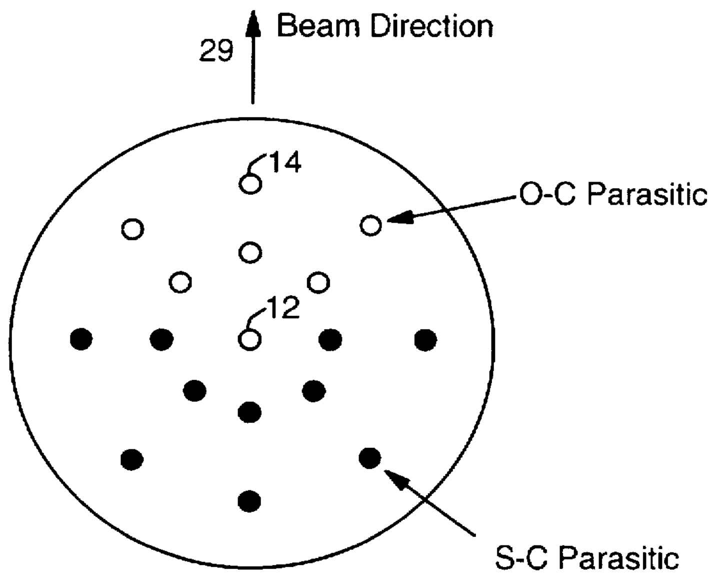
FIG. 4 is a representation of a parasitic loading profile for transmitting a directed radiating pattern for the parasitic monopole array of FIG. 1
Figure 5A:
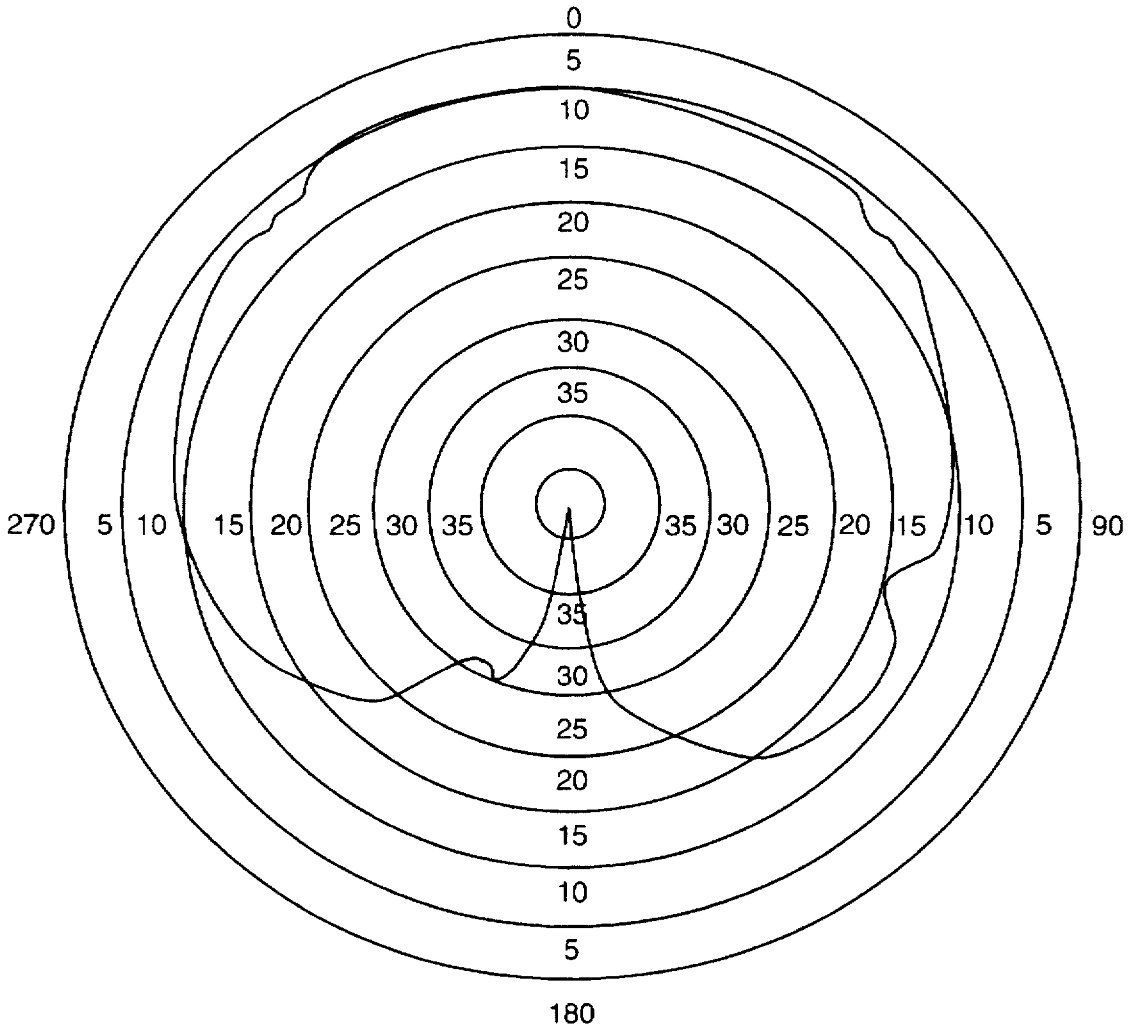
FIG. 5 is a polar diagram of an actual measured radiating patterns for the antenna of FIG. 4.
Figure 5B:
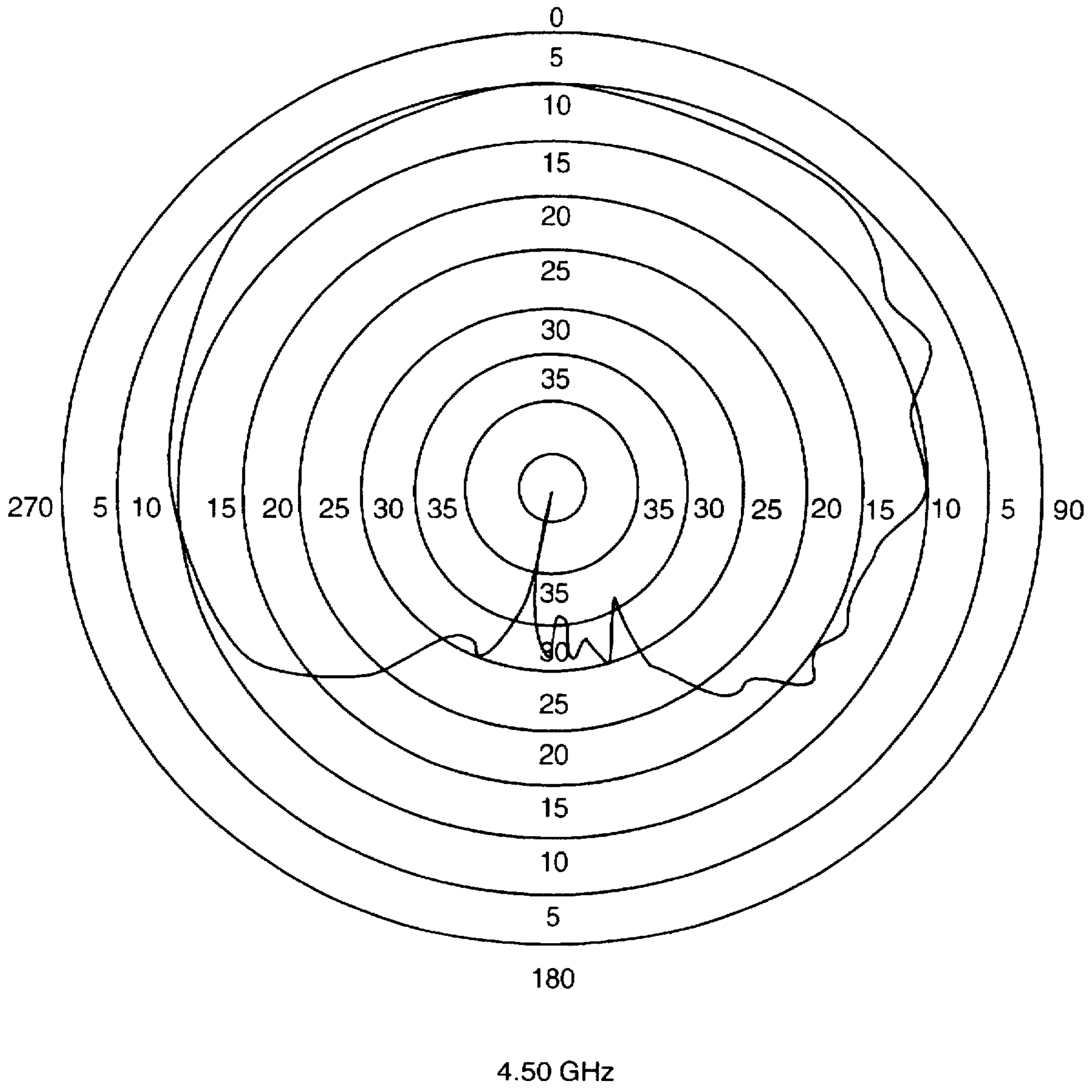
Figure 5C:
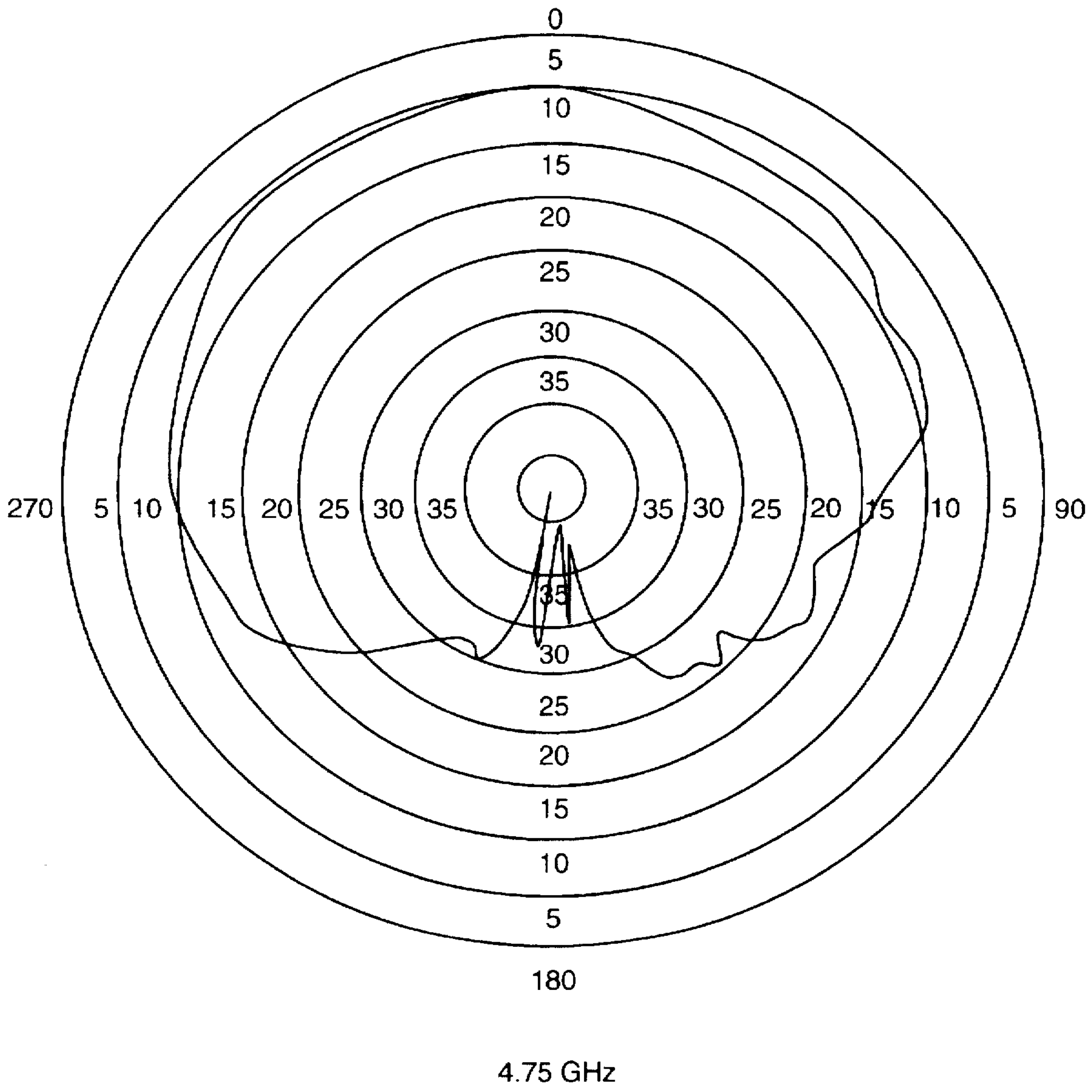
Figure 5D:
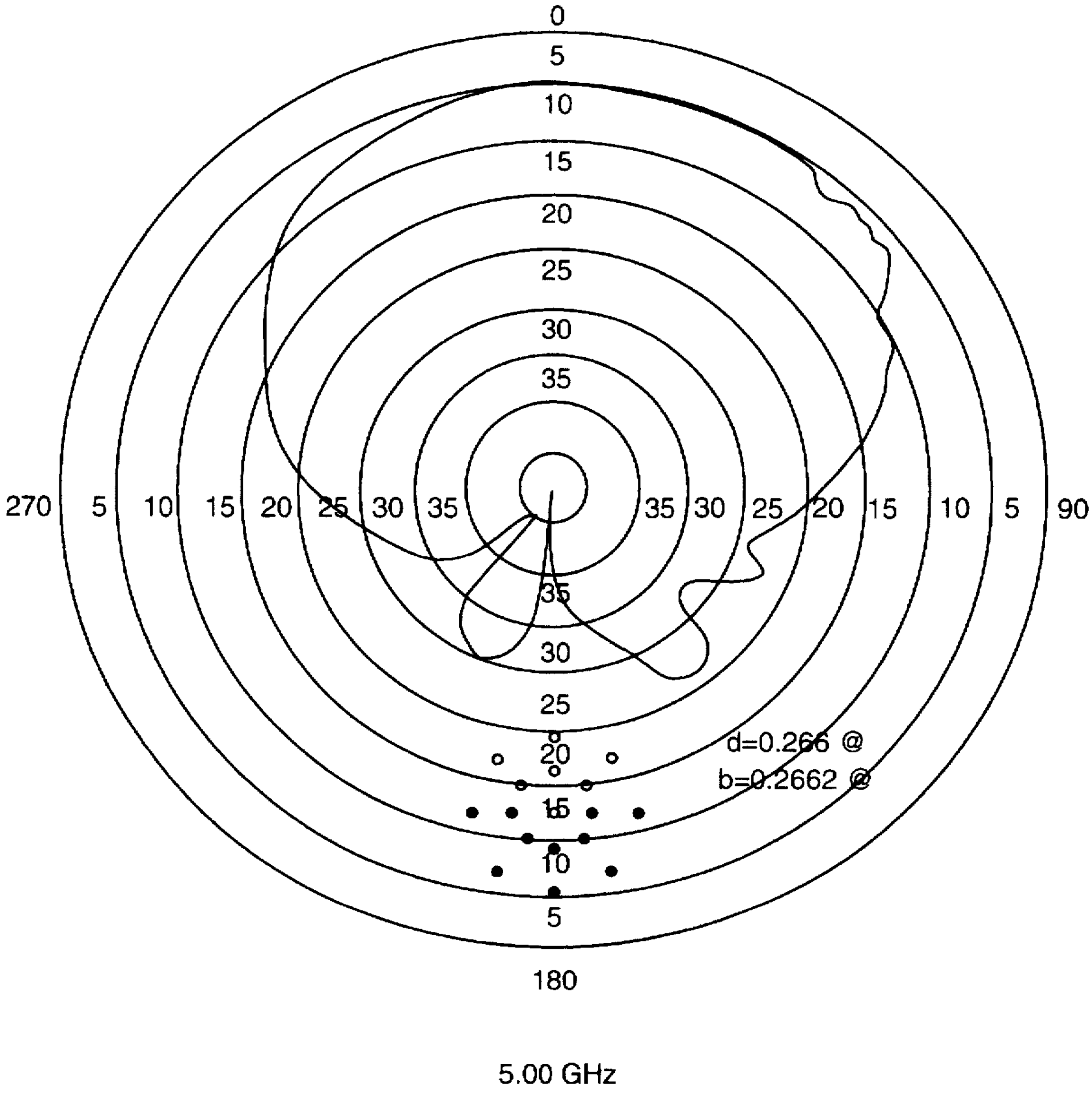

In FIG. 4, 10 of the parasitic elements 14 in the bottom half (90–270 degrees) of the card 10 are short circuited by forward biasing their associated switching devices 20, as explained in conjunction with FIG. 3. The remaining 6 elements in the top half (315–45 degrees) of the card are open circuited by reverse biasing the switching device 20. This condition of the array generates a beam 29 from the radiator 12 directed away from the shorted parasitic. The loading of the parasitic elements in the present invention is different from that suggested by the prior art, principally Harrington article, supra. In the present invention the reactive loading of the parasitic elements is restricted to low or high impedance state rather than a continuous range as described in the Harrington article.

In FIG. 5, the measured antenna patterns at different radiating frequencies confirm the electromagnetic behavior of the antenna. For expediency, the antenna prototype from which the measurements were made, was simplified by omitting the switch and bias elements. The measured patterns confirm the electromagnetic behavior of the antenna of FIG. 4.

By selecting fewer parasitic rows to be short-circuited, the beam width of the antenna can be increased. In the limit, with all parasitic opened an omni directional pattern is created.

Similar but other radiating patterns are available with variations in the general geometry and approach. Significant directivity activity was observed with a single parasitic per radial row, but the back radiation was somewhat higher. The use of three parasitic per row did not appreciably change the gain (the currents in the outside parasitic were quite weak), but undesirable pattern ripple was increased. Quite acceptable radiating patterns were predicted using six radials rather then 8 and useful results can be obtained with even thinner configurations.

Other variations and extensions to the arrays described above, include the following:

Dipole radiators and parasitic can be employed in place of monopoles. The primary advantages for this approach are the overall diameter reduction allowed because a ground plane is unnecessary and possible effective gain increases on the horizon because elevation pattern uptilt (seen with finite ground plane mono-poles) is eliminated. This approach is not nearly as convenient to feed and bias but rf choke and balun designs may be employed to isolate the necessary conductors from the basic desirable antenna interactions.

A single monopole with a biconical horn or discone can improve gain by narrowing the elevation beamwidth. The described monopole arrays can be covered with a conducting plane which flares into a cone. Using both upper and lower cones, it may be possible to create the desirable parasitic effects using elements attached to conically shaped (rather then flat) ground planes. These variations may require adjustments to the element and array dimensions.

A polarizer can also be used to alter the antenna character. Vertical to slant (or arbitrarily oriented linear) or vertical to circular ("meanderline-type) covers could be used.

The antenna of the present invention has potential applications to communications, surveillance and electronic support systems. The antenna can be used in an omni directional mode (all parasitic open circuited) to acquire a signal and then be converted to directional mode to optimize signal strength. In general the user can expect some rejection of unwanted signals based upon the pattern factor. The extent of rejection would depend on the difference in the angle of arrival of the desired and undesired signals.

Figure 6:
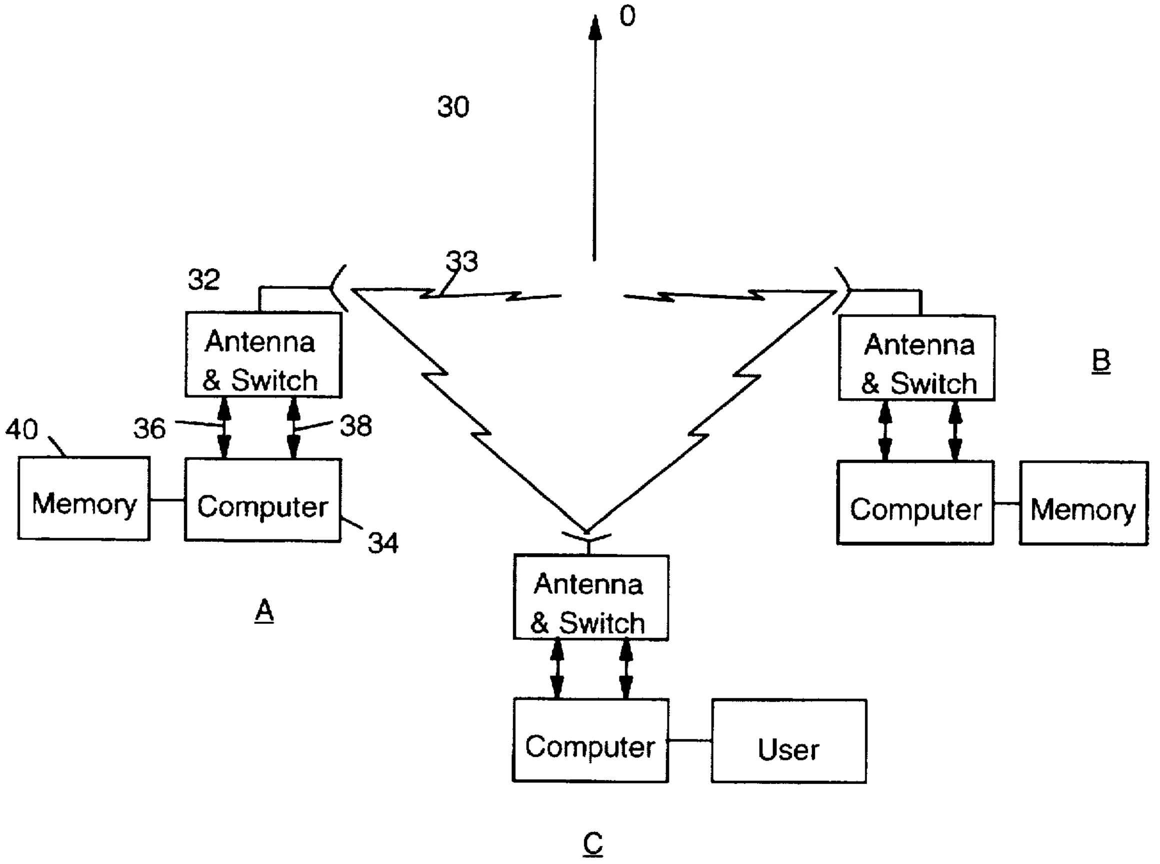
FIG. 6 is a representation of a wireless communication system including a plurality of nodes, each node communicating with the other nodes using a computer operated reactively controlled directive antenna shown in FIG. 1.

One application of the reactively controlled directive antenna array of the present invention may be achieved in a wireless communication system 30 shown in FIG. 6. A plurality of nodes A, B, and C, form a part of a local area network. Each node includes a reactively controlled directive antenna array and switching circuit 32 coupled to the other nodes through wireless links 33. Each antenna and switch 32 is coupled to a computer modem 34 through a first path 36 for transmitting and receiving radio signal to/from the radiating element 12 (See FIG. 1). A second path 38 couples the computer modem to each bias circuit and switch for the parasitic elements of the antenna array. A memory 40 stores program instructions and directional tables for locating the other nodes in the communication system, as will be described hereinafter.

Figure 7:
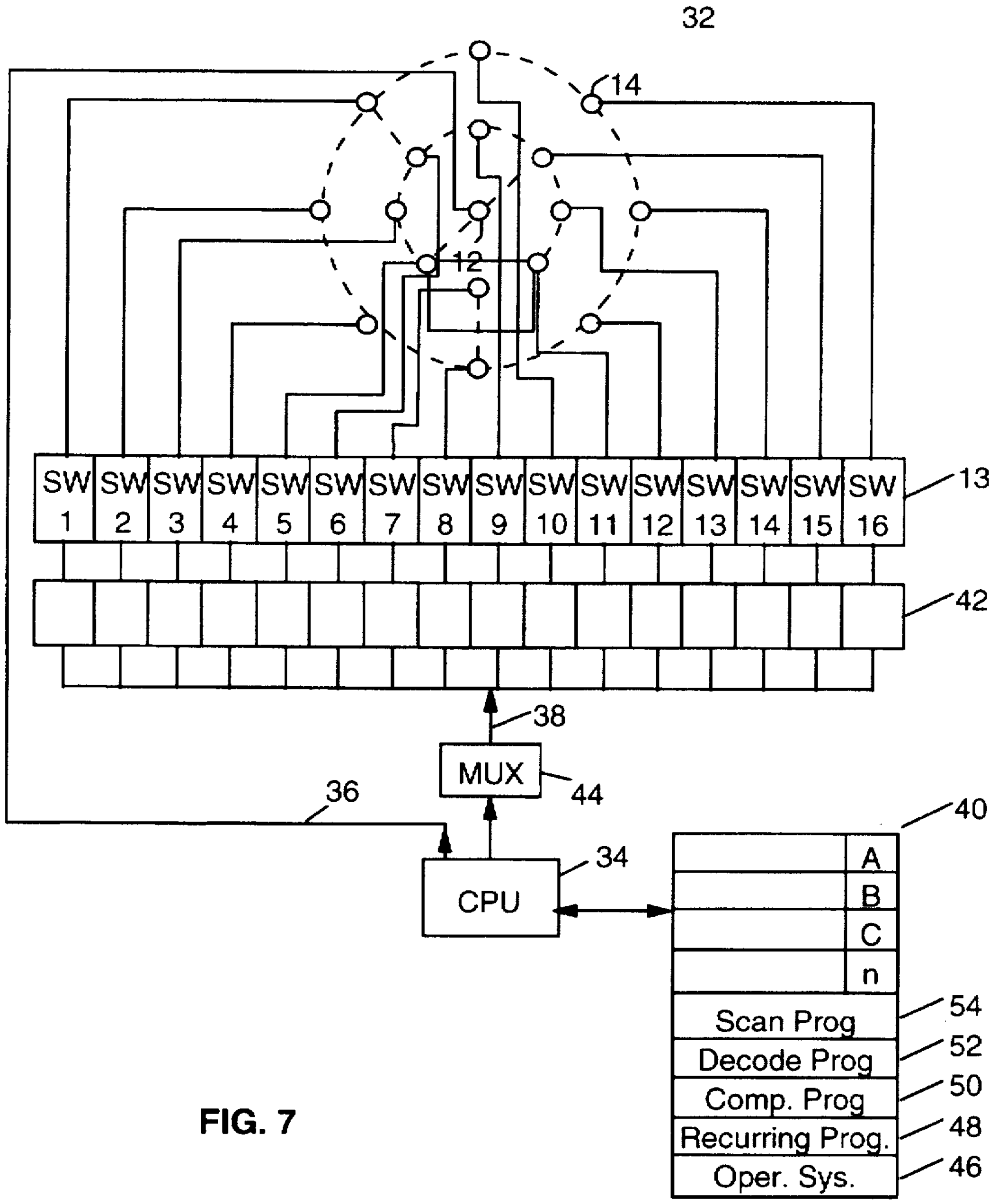
FIG. 7 is an electrical representation of a node in the communication system of FIG. 6.

In FIG. 7, an antenna/switch 32, computer modem 34 and memory 40 are shown for one of the nodes in the system 30.

each node in the system 30 being similarly arranged. In FIG. 7, radiating element 12 is surrounded by parasitic elements 14 in an 8×2 radial arrangement. Each parasitic element is connected to a switch and bias circuit 13 (See FIG. 3). Each switch is coupled to a different stage of a 16 bit register 42 for storing computer generated signals to place the switches 13 in a condition to cause the parasitic element associated therewith to be either "open" or "short circuit" condition, according to the desired direction of the beam radiating from the central element 12. A simpler arrangement would control the biasing of each radial parasitic row pair (2 elements) rather than control each individual parasitic element. Such an arrangement would require 8 control signals rather than 16 and would be consistent with the circuit topology of FIG. 2.

A multiplexer 44 is coupled to the memory 40 through computer modem 34 for distributing signals to each switch 13 for directing the beam of the central monopole 12 to a selected node. The signals are stored in the memory 40 for each node A, B, . . . "n" and provide the pattern for switching the parasitic elements "on" or "off" to point the antenna in the direction of a particular node for communicating purposes. The method of generating the node signals will be described hereinafter.

The computer modem 34 employs stored program instructions in the memory 40 to locate, identify and communicate with other nodes in the system 30. An operating system 46 controls the computer modem in generating, identifying, locating and communicating with other nodes in the system. A receive and detection program 48 provides signals to place the antenna in an omnidirectional mode to receive signals from one of the other nodes not directing signals to the receiving node. A comparison program 50 identifies a preferred direction for the received signals. A decode program 52 identifies the node which is the source of the received signals. A scan program 54 sequentially outputs controls signals to the switching circuits to sequentially change the selected direction of the antenna. Using the stored programs under control of the operating system enables the antenna and switch 34 in combination with the computer modem 34 and memory 40 to locate, identify and communicate with the other nodes in the system 30.

Figure 8:
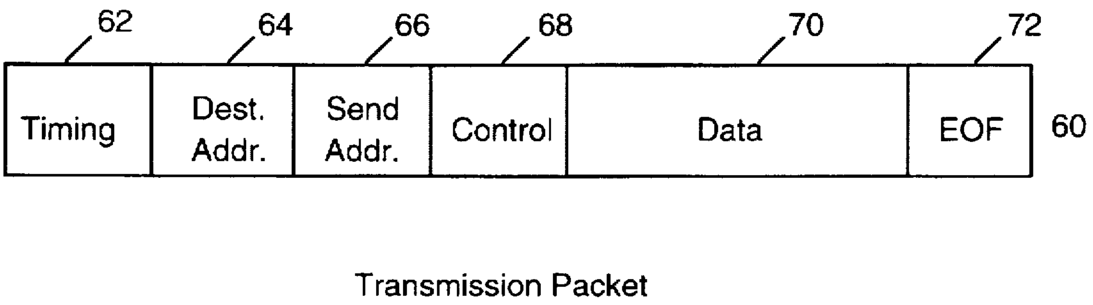
FIG. 8 is a representation of a transmission packet radiated by each node in the communication system of FIG. 6.

As a part of the node communication process, a transmission packet 60, as shown in FIG. 8, is generated by the computer modem 34 for transmission to the central radiating element 12 over the line 36 (see FIG. 6). The transmission packet 60 includes a timing field 62, a destination address 64, a sender address 66, control signals 68, a data field 70, and an end of frame field 72. Each packet is generated as a part of a series of frames and transmitted to another node in a manner well known in the art.

Figure 9:
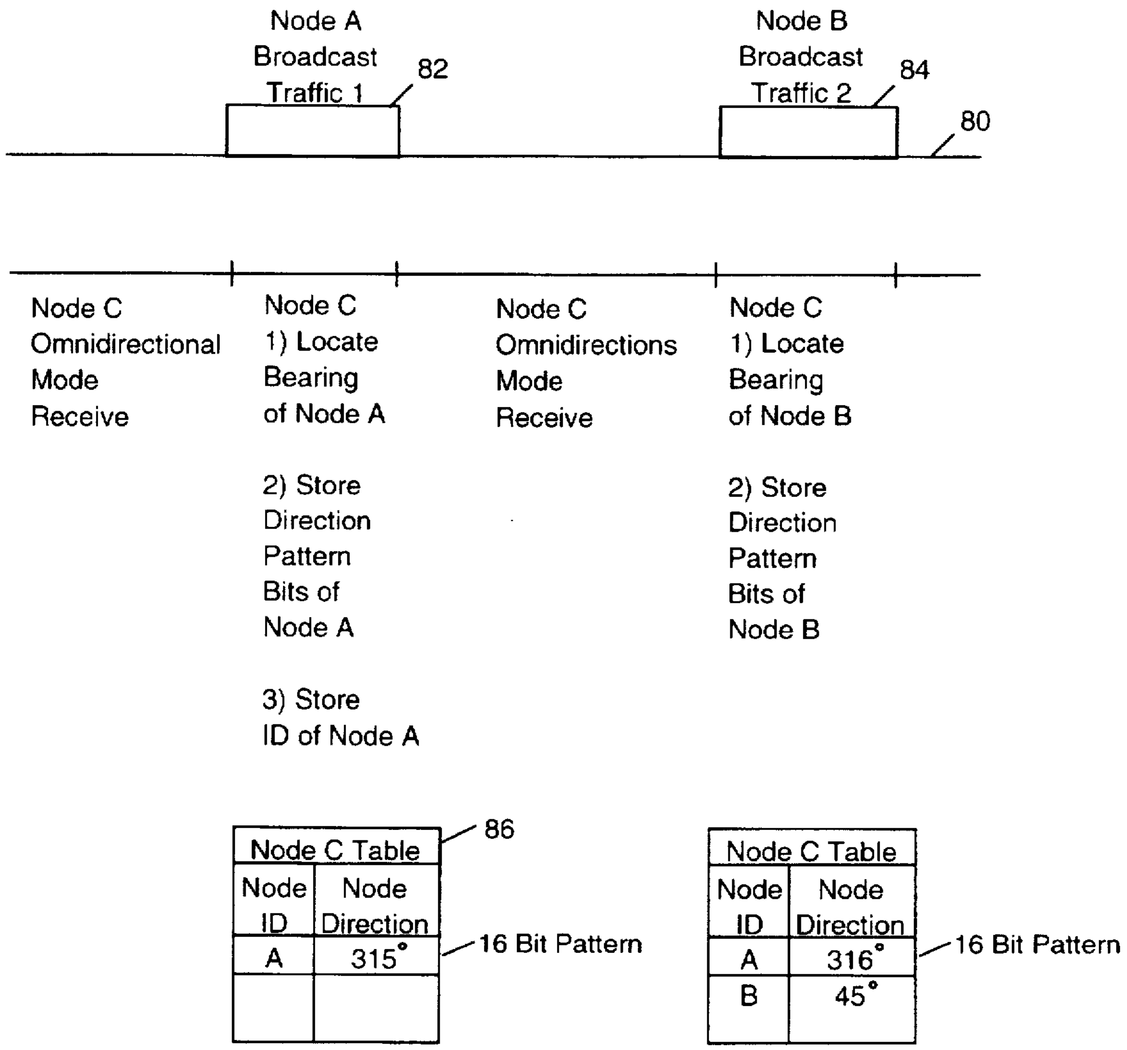
FIG. 9 is a representation of a method for compiling an antenna direction table for communicating with other nodes in the communication system of FIG. 6.

FIG. 9 shows the process of compiling an antenna direction table at node C for communicating with the other nodes B and C which are broadcasting traffic over a LAN 80. The nodes A and B are broadcasting traffic at selected intervals 82 and 84 on the LAN. As a first step, node C is placed in an omni-directional mode state by open circuiting all parasitic elements. Upon detection of a broadcast from either node A or B, node C applies sequential direction pattern bits to the parasitic element switches. The received signal amplitudes for each direction are stored in the memory and compared to identify the greatest signal amplitude. The sender ID and the received transmission packet are decoded and together with the packet directional pattern bits are stored in the memory in a direction table 86 for nodes A and B. After storing of node ID and direction, the antenna is returned to the omni-directional mode to receive the transmission packet from the other node or nodes in the system. As shown in FIG. 10, each direction table 83, 85 and 86 for nodes A, B and C, respectively includes node ID and node direction expressed in 16-bit patterns. The node direction is based upon a 0 degree reference for each node in the LAN.

In FIG. 11, a method for acquiring membership in a local area network is described, as follows:

In a first step, the antenna array 32 associated with the node is placed in an omni-directional mode by the computer modem using the receive program 48 causing all of the parasitic elements to be placed in an "open" condition.

In step two, radio signals in the form of transmission packets are received from existing LAN traffic by the antenna 32 under control of the computer using the scanning program 54.

In step 3, the received transmission packet is examined by the computer modem using the decode program 52 to determine the transmitting node after which in step 4, the received amplitudes are stored in a table in memory and compared using the comparison program 50 to determine the relative direction of the transmitting node.

In step 5, the directional mode for the antenna is set by the computer to communicate with the selected node using the stored direction table in the memory.

In step 6, the computer modem transmits an acquisition request to the selected member using the antenna and the direction determined for the node.

In step 7, permission is acquired from the selected node to communicate with the nodes in the LAN. A time slot assignment; a list of node LANs and a time slot list for the respective nodes is obtained from the accessed node.

In step 8, antenna directional tables are prepared by the computer program using the stored program for the node in the LAN based upon the information provided by the accessed node.

In step 9, the antenna is activated for communication with a selected table using the stored table for the node and the stored programs for operating the antenna. The 16 bit antenna pattern is supplied by the computer to the bias/switch circuits 13 over line 38 by way of the multiplexer 44 to the register 42. The parasitic elements are placed in "open" and "short" states according to the 16 bit pattern for the antenna direction for communicating with the selected node.

In step 10, the radiator 12 transmits and receive signals to/from the selected node, which signals are processed by the computer 34 coupled to the radiator over the line 36 and using the stored programs in the memory 40.

In summary, a reactively controlled directed antenna array is described which has the advantages of simplicity, efficiency and reliability in a wireless communication system when compared to other phased array approaches. The antenna may be used to locate, identify and communicate with each node in a wireless communication system. Each node includes a computer modem and memory coupled to the antenna and through the use of stored programs control the antenna to determine the optimum direction for communicating with another node in the communication system. In particular, wireless communication systems can take advantage of antenna directivity to increase the effective signal power and/or to reject interfering signals, multi-path signals or noise.

While the present invention has been described in a particular embodiment, it should be understood that there may be various embodiments which fall within the spirit and scope of the invention as described in the appended claims:

I claim:

1. In a communication network with a plurality of communicating nodes, a local communication node comprising:

(a) a radio antenna array including a central emitting element having a data input for transmitting a data bearing radio signal, the array also including a plurality of parasitic elements proximate to said emitting element, each parasitic element having a control input;

(b) a plurality of impedance switching circuits, each coupled to one of said plurality of parasitic elements for selectively changing the parasitic impedance of each parasitic element to said radio signal;

(c) said radio antenna array broadcasting an omni directional mode signal when all of said parasitic elements are in a high impedance state and said array broadcasting a directed mode radio signal in a selected direction when a selected sub-plurality of said parasitic elements are selectively placed in a lower impedance state in response to said switching circuits;

(d) a computer modem having a first data path coupled to said emitting element for sending and receiving data by said radio signal with other ones of said plurality of nodes in said network, and having a second data path coupled to said switching circuits for outputting signals representing said selected direction;

(e) a memory in said computer for storing program instructions and a table of antenna direction values representing directions between the local node and said other ones of said plurality of nodes; and (f) said computer communicating with a selected one of said other ones of said plurality of nodes by accessing a selected direction value from said memory for said selected one node and outputting signals on said second data path to said switching circuits and exchanging communication signals with said emitting element over said first data path.

2. The communication node of claim 1 further comprising:

(i) receiving means in said computer for selecting said omni directional mode while receiving a broadcast from one of said other ones of said plurality of nodes that is not directed to said local node;

(ii) scanning means in said computer to sequentially output control signals to said switching circuits to sequentially change said selected direction of said antenna array;

(iii) comparison means in said computer to identify a preferred direction for said receive broadcast;

(iv) decode means in said computer for decoding an identity of said one other nodes; and (v) said computer storing said identity and said preferred direction in said table in said memory.

3. The communication of claim 2 further comprising:

detection means in said computer detecting of broadcast from one of said other nodes that is directed to said local node and in response thereto selecting said directed mode; and said computer accessing said preferred direction of said one other nodes from said memory using said identity and outputting on said second data path to switching circuits to enable exchanging directed mode radio signals with said one other nodes.

4. The communication node of claim 1 wherein said impedance switching circuits further comprise:

a substantially vertical conductor mounted above a substantially horizontal ground plane as a parasitic element;

a printed circuit transmission line with a first end connected to said conductor and second end connected through a low radio-frequency impedance to said ground plane, said transmission line having an electrical length substantially one quarter of a wavelength of said radio signal, forming a high impedance at said first end;

a switching device connected between said conductor and said ground plane having a low impedance when forward biased and a high impedance when not forward biased; and a switch connected between said second end of said transmission line and a bias voltage source having a control input coupled to said second data path from said computer for selectively forward biasing said switching device and thereby reducing the parasitic impedance of said conductor to said radio signal.

5. A method for accessing and communicating with nodes in a local area network including a computer modem and memory, comprising the steps of:

selecting an omni directional mode for a directional antenna coupled to the computer modem;

receiving radio signals from existing traffic in the local area network which includes a plurality of nodes, each node including a directional antenna coupled to the computer modem;

identifying a node of the local area network using the directional antenna and computer modem;

determining a valid direction of a selected node of the network;

selecting a directional mode for the directional antenna and setting the antennas direction to the selected node;

transmitting an acquisition request to the selected node, using the directional antenna and selected direction;

receiving permission; a time slot list for the respective nodes of the local area network;

identifying an antenna for each respective node of the network and storing the direction in a computer table in the memory;

setting the direction for said directional antenna to begin a communication sequence with the selected node of the local area network; and transmitting and receiving radio communications with said selected node over said selected direction.

6. The method of claim 5 wherein each directional antenna comprises a central radiating element surrounded by a plurality of parasitic elements and the step of selecting an omni directional mode for directional antennas further comprises the step of:

placing the parasitic elements in an "open circuit" state for receiving radio signals by the directional antenna.

7. The method of claim 6 wherein the step of selecting a directional mode for the directional antenna further comprises the steps of:

placing selected parasitic elements in a "short circuit" state;

transmitting a radio beam from the central radiating element in a selected direction based upon the parasitic elements placed in the "short circuit" state.

8. The method of claim 7 further comprising the step of:

changing the "short circuit" state of the parasitic elements to form a beam steered radio signal.

9. The method of claim 8 wherein the memory comprises a plurality of stored program instructions and the step of identifying a node in the local area network further comprises the step of using a detection program stored in the memory to identify each node in the local area network.

10. The method of claim 9 further comprises the step of forming a table in the memory providing an antenna direction to each node in the local area network.

11. An electronic reconfigurable antenna comprising:

a supporting member having a top surface and a ground plane bottom surface and an opening;

A radiating element mounted in the opening;

a plurality of microstrip lines surrounding the opening with each microstrip forming an rf choke by virtue of their high characteristic impedance, substantially quarter-wavelength electrical length, and low rf impedance to ground termination at a bias feed point;

a plurality of antenna elements surrounding the radiating element, each antenna element attached to a different microstrip at the via;

A plurality of switching device, each switching device coupled at one end to a different antenna element through the via hole and at the other end to a said ground plane on a back surface of the supporting member;

a bias circuit coupled to each switching device whereby one state of the bias circuit places the switching device in a conducting condition to cause the attached antenna element to be in a low impedance state; a second state of the bias circuit causing the switching device to be in a non-conducting condition causing the antenna element to be in high impedance state; and means for causing the antenna to be in an omnidirectional state when the antenna elements are in high impedance state and causing the antenna to be in a directional state when the antenna elements are in a low impedance state.

* * * * *